(12) United States Patent
Lin et al.

(10) Patent No.: US 11,374,628 B2
(45) Date of Patent: Jun. 28, 2022

(54) METHOD FOR TRANSMITTING FEEDBACK INFORMATION, TERMINAL DEVICE AND NETWORK DEVICE

(71) Applicant: GUANGDONG OPPO MOBILE TELECOMMUNICATIONS CORP., LTD., Dongguan (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/390,818

(22) Filed: Jul. 30, 2021

(65) Prior Publication Data
US 2021/0359729 A1  Nov. 18, 2021

Related U.S. Application Data

(63) Continuation of application No. PCT/CN2019/074494, filed on Feb. 1, 2019.

(51) Int. Cl.
*H04W 4/00* (2018.01)
*H04B 7/0417* (2017.01)
(Continued)

(52) U.S. Cl.
CPC ......... *H04B 7/0417* (2013.01); *H04B 7/0456* (2013.01); *H04L 1/1819* (2013.01); *H04L 1/1896* (2013.01)

(58) Field of Classification Search
CPC ... H04B 7/0417; H04B 7/0456; H04L 1/1819; H04L 1/1896
(Continued)

(56) References Cited

U.S. PATENT DOCUMENTS

| 9,893,783 B2 * | 2/2018 | Eichinger ............ H04B 7/0641 |
| 10,999,041 B2 * | 5/2021 | Lin ........................ H04L 1/1614 |

(Continued)

FOREIGN PATENT DOCUMENTS

| CN | 102281128 A | 12/2011 |
| CN | 102684853 A | 9/2012 |

(Continued)

OTHER PUBLICATIONS

International Search Report issued in corresponding International Application No. PCT/CN2019/074494, dated Oct. 24, 2019, 29 pages.

(Continued)

*Primary Examiner* — Chuong T Ho
(74) *Attorney, Agent, or Firm* — Bayes PLLC

(57) ABSTRACT

The embodiments of the present disclosure relate to a method for transmitting feedback information and a terminal device. The method includes receiving, by a terminal device, trigger signaling. The trigger signaling is used for triggering the terminal device to send feedback information. The method further includes determining, by the terminal device, to send a first feedback information codebook or a second feedback information codebook according to the trigger signaling. The first feedback information codebook includes feedback information corresponding to at least one downlink channel indicated by the trigger signaling, and the second feedback information codebook is a full codebook.

14 Claims, 4 Drawing Sheets

(51) Int. Cl.
*H04B 7/0456* (2017.01)
*H04L 1/18* (2006.01)

(58) Field of Classification Search
USPC .................................................. 370/329, 330
See application file for complete search history.

(56) References Cited

U.S. PATENT DOCUMENTS

| 11,038,574 | B2* | 6/2021 | Chen | H04B 7/0632 |
|---|---|---|---|---|
| 2018/0212660 | A1* | 7/2018 | Gao | H04L 5/0048 |
| 2018/0375485 | A1 | 12/2018 | Ishihara | |
| 2019/0245608 | A1* | 8/2019 | Kakishima | H04B 7/0617 |
| 2020/0178241 | A1* | 6/2020 | Wu | H04L 1/0026 |
| 2021/0226757 | A1* | 7/2021 | Lin | H04L 5/0055 |
| 2021/0314102 | A1* | 10/2021 | Li | H04B 7/0456 |

FOREIGN PATENT DOCUMENTS

| CN | 106301509 A | 1/2017 |
|---|---|---|
| EP | 3857801 A1 | 8/2021 |
| WO | 2020143052 A1 | 7/2020 |

OTHER PUBLICATIONS

PCT Written Opinion of the International Searching Authority issued in corresponding International Application No. PCT/CN2019/074494, dated Oct. 24, 2019, 9 pages.
"Feature lead summary of HARQ enhancements for NR U", Agenda item: 7.2 2.2 3, Source: Huawei, 3GPP TSG RAN NG1 Meeting AH1901, R1 1901357, Taipei, Jan. 21 25, 2019, 9 pages.
"Feature lead summary of HARQ enhancements for NR U", Agenda item: 7.2.2.2.3, Source: Huawei, 3GPP TSG RAN NG1 Meeting AH1901, R1 1901437, Taipei, Jan. 21 25, 2019, 10 pages.
Extended European Search Report issued in corresponding European Application No. 19912827.3, dated Dec. 23, 2021, 13 pages.
"On NR-U HARQ scheduling and feedback enhancements", Agenda item: 7.2.2.2.3, Source: Nokia, Nokia Shanghai Bell, 3GPP TSG RAN WG1 Ad-Hoc Meeting 1901, R1-1900264, Taipei, Taiwan, Jan. 21-25, 2019, 7 pages.
"Enhancements to HARQ for NR-U operation", Agenda Item: 7.2.2.4.3, Source: MediaTek Inc., 3GPP TSG RAN WG1 Ad-Hoc Meeting 1901, R1-1900188, Taipei, Taiwan, Jan. 21-25, 2019, 10 pages.
"HARQ enhancements for NR-U ", Agenda Item: 7.2.2 2.3, Source: Oppo, 3GPP TSG RAN WG1 Ad-Hoc Meeting 1901, R1-1900274, Taipei, Jan. 21-25, 2019, 5 pages.
First Office action issued in corresponding Chinese Application No. 202110137617.8, dated Apr. 13, 2022, 16 pages.

* cited by examiner

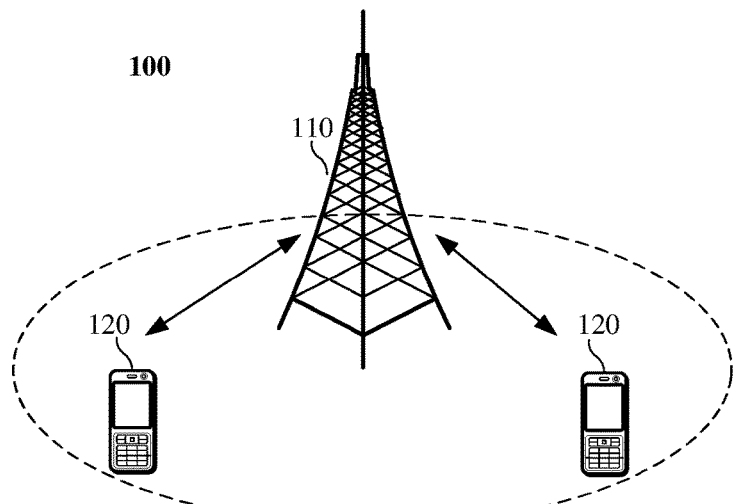
FIG. 1
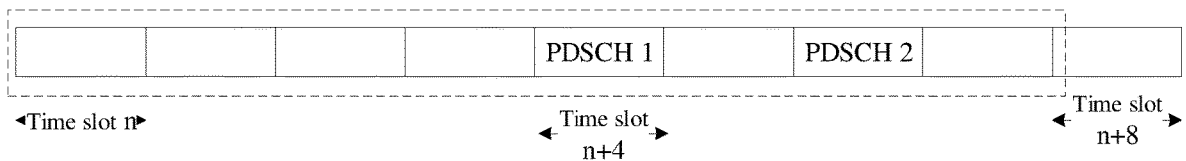
FIG. 2
200
Receiving, by a terminal device, trigger signaling, wherein the trigger signaling is used for triggering the terminal device to send feedback information — S210
Determining, by the terminal device, to use a first feedback mode or a second feedback mode to send a feedback information codebook according to the trigger signaling — S220
FIG. 3

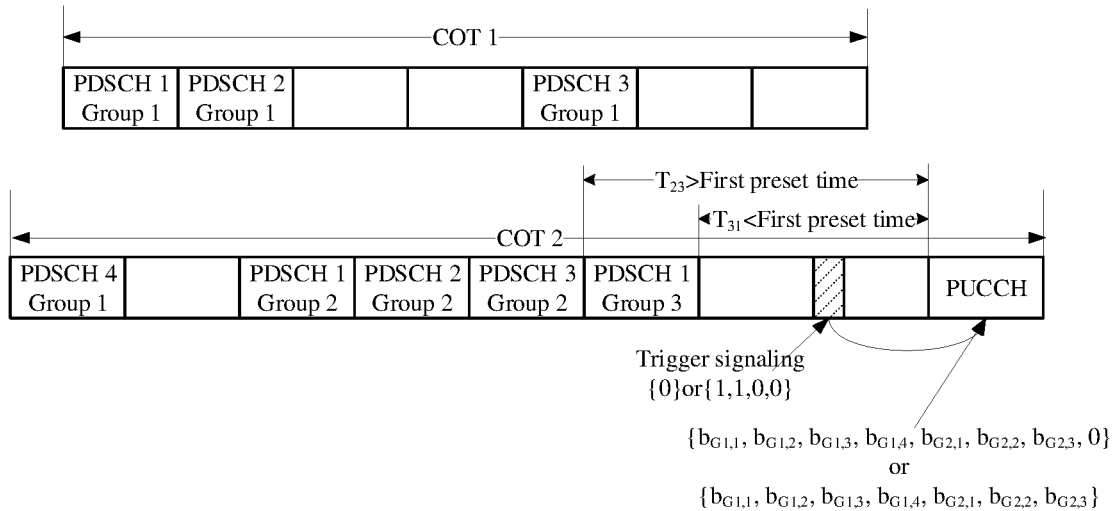
FIG. 4
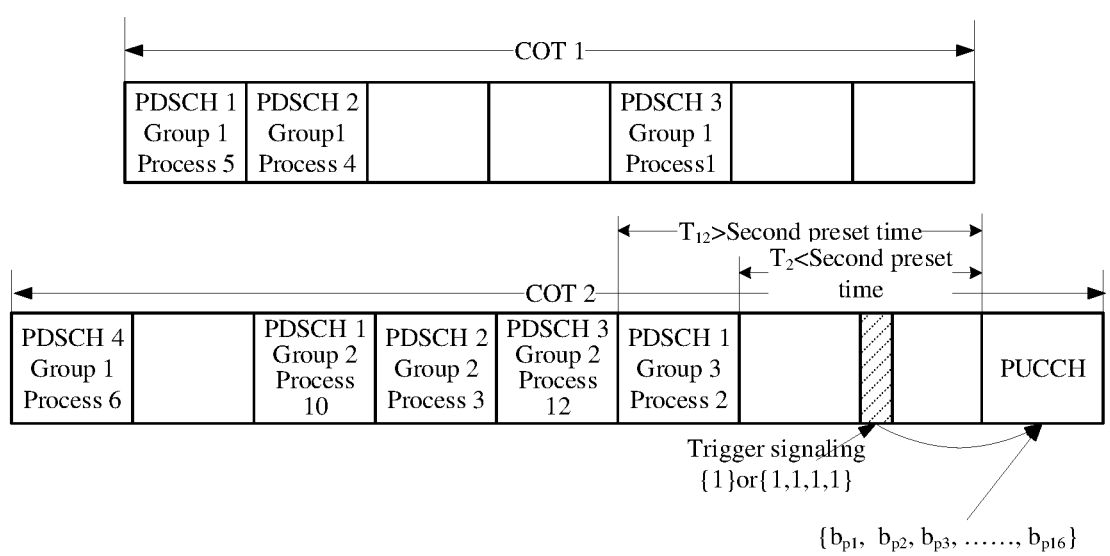
FIG. 5
300
Sending, by a network device, trigger signaling, wherein the trigger signaling is used for triggering a terminal device to send a feedback information codebook, and the feedback information codebook is sent by using a first feedback mode or a second feedback mode — S310
FIG. 6

METHOD FOR TRANSMITTING FEEDBACK INFORMATION, TERMINAL DEVICE AND NETWORK DEVICE

CROSS-REFERENCE TO RELATED APPLICATION

The present application is a continuation of International Application No. PCT/CN2019/074494, filed on Feb. 1, 2019, the entire contents of which are incorporated herein by reference.

BACKGROUND

The present disclosure relates to the field of communications, and more particularly, to a method for transmitting feedback information, a terminal device and a network device.

For NR-based access to unlicensed spectrum (NR-U) for Rel-16 in a new radio (NR) system, it supports a case where a hybrid automatic repeat request (HARQ) feedback timing (HARQ-timing) with an infinite value is introduced into downlink control information (DCI), and the infinite value indicates that transmission time and resource for ACK/NACK feedback information corresponding to a physical downlink shared channel (PDSCH) scheduled by the DCI cannot be determined temporarily.

A base station sends trigger signaling, and a terminal device determines the ACK/NACK corresponding to the PDSCH before transmission based on the trigger signaling. In order to ensure that the terminal device and the base station have a same understanding of triggered feedback information, many companies propose to indicate PDSCH group information in the trigger signaling, and the terminal determines which PDSCH with corresponding feedback information that is included in feedback information codebook according to the group information.

Therefore, the terminal device must first determine the group information corresponding to each received PDSCH. For example, when information field of the HARQ feedback timing in the DCI for scheduling the PDSCH takes a specific value, the information field may be used for indicating information of a downlink transmission group.

The biggest advantage of this method is that it can indicate the downlink transmission group information without increasing DCI overhead. However, when the information field of the HARQ feedback timing in the DCI for scheduling the PDSCH is not the specific value, the PDSCH has no corresponding group information. The trigger signaling based on a downlink resource group cannot trigger the terminal device to send the feedback information corresponding to the PDSCH, which reduces downlink transmission efficiency.

SUMMARY

Embodiments of the present disclosure provide a method for transmitting feedback information, a terminal device, and a network device.

A first aspect provides a method for transmitting feedback information, including receiving, by a terminal device, trigger signaling, wherein the trigger signaling is used for triggering the terminal device to send feedback information; and determining, by the terminal device, to use a first feedback mode or a second feedback mode to send a feedback information codebook according to the trigger signaling, wherein the first feedback mode is that the feedback information codebook includes feedback information corresponding to at least one downlink transmission channel or downlink transmission resource indicated by the trigger signaling, and the second feedback mode is that the feedback information codebook is a full codebook.

A second aspect provides a method for transmitting feedback information, including sending, by a network device, trigger signaling, wherein the trigger signaling is used for triggering a terminal device to send a feedback information codebook, and the feedback information codebook is send by using a first feedback mode or a second feedback mode; wherein the first feedback mode is that the feedback information codebook includes feedback information of at least one downlink transmission channel or downlink transmission resource indicated by the trigger signaling, and the second feedback mode is that the feedback information codebook is a full codebook.

A third aspect provides a terminal device, configured to perform the method in the first aspect or any of the implementations thereof. Specifically, the terminal device includes a functional module configured to perform the method in the first aspect or any of the implementations thereof.

A fourth aspect provides a network device, configured to perform the method in the second aspect or any of the implementations thereof. Specifically, the network device includes a functional module configured to perform the method in the second aspect or any of the implementations thereof.

A fifth aspect provides a terminal device, including a processor and a memory. The memory is configured to store a computer program, and the processor is configured to call and run the computer program stored in the memory to execute the method in the first aspect or any of the implementations thereof.

A sixth aspect provides a network device, including a processor and a memory. The memory is configured to store a computer program, and the processor is configured to call and run the computer program stored in the memory to execute the method in the second aspect or any of the implementations thereof.

A seventh aspect provides a chip, configured to perform the method in any one of the first to second aspects or any of the implementations thereof. Specifically, the chip includes a processor, configured to call and run a computer program from a memory, so that a device installed with the chip performs the method in any one of the first to second aspects or any of the implementations thereof.

An eighth aspect provides a computer-readable storage medium, configured to store a computer program that causes a computer to perform the method in any one of the first to second aspects or any of the implementations thereof.

A ninth aspect provides a computer program product, including computer program instructions, which cause the computer to perform the method in any one of the first to second aspects or any of the implementations thereof.

A tenth aspect provides a computer program which, when runs on a computer, causes the computer to perform the method in any one of the first to second aspects or any of the implementations thereof.

BRIEF DESCRIPTION OF THE DRAWINGS

FIG. 1 is a schematic diagram of a communication system architecture provided by an embodiment of the present disclosure.

FIG. 2 is a schematic diagram of PDSCH transmission provided by an embodiment of the present disclosure.

FIG. 3 is a schematic flowchart of a method for transmitting feedback information provided by an embodiment of the present disclosure.

FIG. 4 is a schematic diagram of a downlink transmission channel and feedback information provided by an embodiment of the present disclosure.

FIG. 5 is a schematic diagram of another downlink transmission channel and feedback information provided by an embodiment of the present disclosure.

FIG. 6 is a schematic flowchart of another method for transmitting feedback information provided by an embodiment of the present disclosure.

DETAILED DESCRIPTION

Figure 7:
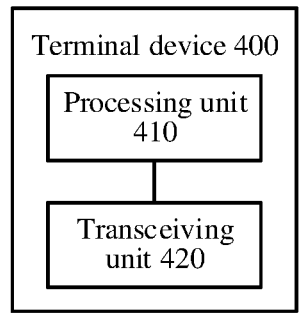
FIG. 7 is a schematic block diagram of a terminal device provided by an embodiment of the present disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a General Packet Radio Service (GPRS), a Long Term Evolution (LTE) system, an LTE Frequency Division Duplex (FDD) system, an LTE Time Division Duplex (TDD), a communications system, a 5G system, or the like.

Exemplarily, a communication system 100 applied in an embodiment of the present disclosure is shown in FIG. 1. The communication system 100 may include a network device 110. The network device 110 may be a device communicating with a terminal device 120 (or referred to as a communication terminal or a terminal). The network device 110 may provide communication coverage to a specific geographic region, and may communicate with the terminal device located within the coverage region. Optionally, it may be an evolutional node B (eNB or eNodeB) in an LTE system, or a radio controller in a cloud radio access network (CRAN). Or, the network device may be a mobile switching center, a relay station, an access point, a vehicle device, a wearable device, a concentrator, a switchboard, a network bridge, a router, a network-side device in a 5G network, or a network device in a public land mobile network (PLMN) that will be evolved in the future, and the like.

The communication system 100 further includes at least one terminal device 120 located within a coverage range of the network device 110. The "terminal device" used herein includes, but not limited to, connection via a wired line, such as connection via public switched telephone networks (PSTN), a digital subscriber line (DSL), a digital cable, and a direct cable; and/or another data connection/network; and/or via a wireless interface, for example, for a cellular network, a wireless local area network (WLAN), a digital television network such as a DVB-H network, a satellite network and an AM-FM broadcast transmitter; and/or an apparatus of another terminal device, which is configured to receive/transmit a communication signal; and/or an Internet of things (IoT) device. The terminal device configured to realize communication through a wireless interface may be referred to as a "wireless communication terminal", a "wireless terminal", or a "mobile terminal". Examples of the mobile terminal include, but not limited to, a satellite or cellular phone, and a personal communications system (PCS) terminal that may combine a cellular radiotelephone with data processing, facsimile, and data communication capabilities; a personal digital assistant (PDA) that can include a radiotelephone, a pager, an Internet/intranet access, a Web browser, a notepad, a calendar, and/or a global positioning system (GPS) receiver; and a conventional laptop and/or palmtop receiver or other electronic apparatuses including radiotelephone transceivers. The terminal device may refer to an access terminal, UE, a user unit, a user station, a mobile station, a mobile platform, a remote station, a remote terminal, a mobile device, a user terminal, a terminal, a wireless communication device, a user agent, or a user apparatus. The access terminal may be a cellular phone, a cordless telephone, a session initiation protocol (SIP) telephone, a wireless local loop (WLL) station, a PDA, a handheld device having a wireless communication function, a computation device or other processing devices connected to a radio modem, a vehicle device, a wearable device, a terminal device in a 5G network, or a terminal device in the PLMN that will be evolved in the future, and the like.

Optionally, device to device (D2D) communication may be realized between the terminal devices 120.

Optionally, a 5G system or 5G network may also be referred to as a new radio (NR) system or NR network.

FIG. 1 exemplarily illustrates one network device and two terminal devices. Optionally, the communication system 100 may include a plurality of network devices, and a coverage range of each network device may include other numbers of terminal devices, which is not limited by the embodiment of the present disclosure.

Optionally, the communication system 100 may also include other network entities such as a network controller and a mobile management entity, which is not limited by the embodiment of the present disclosure.

It should be understood that a device having a communication function in a network/system in the embodiment of the present disclosure may be referred to as a communication device. The communication system 100 shown in FIG. 1 is taken as an example. The communication device may include a network device 110 and terminal device 120 which have communication functions. The network device 110 and the terminal device 120 may be the above-mentioned specific devices, and descriptions thereof are omitted here. The communication device may also include other devices in the communication system 100, such as other network entities including the network controller, the mobile management entity, and the like, which is not limited by the embodiment of the present disclosure.

It should be understood that the terms "system" and "network" herein may often be interchanged herein. The term "and/or" herein is only an association relationship that describes associated objects, and represents that there may be three relationships. For example, A and/or B may represent that A exists alone, A and B exist simultaneously, and B exists alone. In addition, the character "/" herein generally indicates that associated objects before and after the same are in an "or" relationship.

The unlicensed spectrum is a spectrum allocated by countries and regions which is available for radio equipment communication. This spectrum is generally considered to be a shared spectrum, that is, communication devices in different communication systems can use this spectrum if they meet regulatory requirements specified by the countries or regions on the spectrum, and there is no need to apply to the government for a proprietary spectrum license. In order to allow various communication systems that use the unlicensed spectrum for wireless communication to coexist amicably on this spectrum, some countries or regions have stipulated the regulatory requirements that must be met when using the unlicensed spectrum. For example, in some regions, the communication device follows a "first listening and then speaking" principle, that is, the communication device needs to perform a channel listening before transmitting a signal on a channel of the unlicensed spectrum, and can perform signal transmission only when a result of the channel listening indicates an idle channel. If the channel listening result of the communication device on the channel of the unlicensed spectrum indicates that the channel is busy, the communication device cannot perform the signal transmission. In order to ensure fairness, the duration of the signal transmission by the communication device using the channel of the unlicensed spectrum in a transmission process cannot exceed a Maximum Channel Occupation Time (MCOT).

With the development of wireless communication technologies, both LTE system and NR system will consider deploying networks on the unlicensed spectrum to perform data service transmission by using the unlicensed spectrum.

In NR Release 15 (Rel-15), dynamically determining a HARQ feedback timing (HARQ-timing) is supported. A terminal device first determines a pre-configured HARQ timing set, and a base station indicates a value k in the HARQ timing set by using Downlink Control Information (DCI). If a Physical Downlink Shared Channel (PDSCH) scheduled by the DCI is transmitted in a slot n, corresponding acknowledgement/non-acknowledgement (ACK/NACK) information is transmitted in a slot n+k. The pre-configured HARQ-timing set can include up to eight values. For different DCI formats, the eight values can be different. For example, for DCI format 1_0, the set is agreed by the protocol, and for DCI format 1_1, the set can be configured by the base station.

In addition, the NR Rel-15 system also supports ACK/NACK multiplexed transmission, that is, ACK/NACK information corresponding to multiple PDSCHs is transmitted through one channel. For ACK/NACK multiplexed transmission, two ACK/NACK information generation methods are further supported: a semi-static ACK/NACK codebook (semi-static HARQ-ACK codebook) and a dynamic ACK/NACK codebook (dynamic HARQ-ACK codebook).

The semi-static ACK/NACK codebook is determined based on elements in the pre-configured feedback timing set. Since the feedback timing set is agreed by the protocol or configured semi-statically in high levels, the number of ACK/NACK bits included in the ACK/NACK codebook will not change in accordance with an actual scheduling situation. The advantage of this solution is that there will be no ambiguity in understanding of the number of bits of feedback information and a mapping relationship between the base station and the UE. However, the disadvantage is that the feedback overhead is large, and even if only a small number of PDSCHs is scheduled, a complete ACK/NACK codebook should be transmitted, which may contain a large amount of redundant information. For example, as shown in FIG. 2, in the case of single-carrier and single-codeword transmission, assuming that the value of the HARQ-timing set indicated in DCI is 8, the number of elements in the pre-configured feedback timing set is 8, and the pre-configured feedback timing set is {1,2,3,4,5,6,7,8}, the number of ACK/NACK bits is also 8. Actually, however, as shown in FIG. 2, only two PDSCHs are transmitted, that is, there are 6 bits of redundant information.

The dynamic ACK/NACK codebook mainly solves the problem of feedback overhead, that is, in the downlink slot corresponding to the feedback time set, the number of bits of the ACK/NACK information is determined based on the number of the PDSCHs which are actually scheduled. The specific DCI which schedules the PDSCH transmission introduces a Downlink Assignment Index (DAI) information field to indicate a total number of PDSCHs that have been scheduled up to a currently scheduled PDSCH. For example, in FIG. 2, in the case of the single-carrier and single-codeword transmission, the terminal device receives two PDSCHs, PDSCH 1 and PDSCH 2, and in this case, the terminal device only needs to feedback 2-bit information. The disadvantage of this method is that when the terminal device does not receive part of the PDSCHs transmitted by the base station, such as the last PDSCH 2 in FIG. 2, there is a problem that the base station and the UE are of inconsistent understandings in the number of the PDSCHs actually scheduled, resulting in an inconsistent understanding in the number of bits of the feedback information.

For the NR-U in Rel-16, it supports a case where the HARQ-timing with an infinite value is introduced into the downlink control signaling. This value indicates that the transmission time and resource of the ACK/NACK feedback information corresponding to the PDSCH scheduled by the DCI cannot be determined temporarily. Subsequently, the base station sends trigger signaling, and the terminal device determines the ACK/NACK corresponding to the PDSCH before transmission based on the trigger signaling. In order to ensure that the terminal device and the base station have a same understanding of triggered feedback information, many companies propose to indicate PDSCH group information in the trigger signaling, and the terminal device determines which PDSCH with corresponding feedback information that is included in feedback information codebook according to the group information.

Therefore, the terminal device must first determine the group information corresponding to each received PDSCH. For example, when information field of the HARQ feedback timing in the DCI for scheduling the PDSCH takes a specific value, the information field may be used for indicating information of a downlink transmission group. The biggest advantage of this method is that it can indicate the downlink transmission group information without increasing DCI overhead. However, when the information field of the HARQ feedback timing in the DCI for scheduling the PDSCH is not the specific value, the PDSCH has no corresponding group information. The trigger signaling based on a downlink resource group cannot trigger the terminal device to send the feedback information corresponding to the PDSCH, which reduces downlink transmission efficiency.

Therefore, the embodiments of the present disclosure provide a method for transmitting feedback information.

The terminal device selects a feedback mode from multiple feedback modes to determine the feedback information codebook based on the indication of the trigger signaling, which can effectively improve the transmission efficiency.

FIG. 3 is a schematic flowchart of a method 200 for transmitting feedback information according to an embodiment of the present disclosure. The method 200 may be executed by a terminal device, for example, the terminal device may be the terminal device 120 shown in FIG. 1. As shown in FIG. 3, the method 200 includes S210, receiving, by the terminal device, trigger signaling, wherein the trigger signaling is used for triggering the terminal device to send feedback information; and S220, determining, by the terminal device, to use a first feedback mode or a second feedback mode to send a feedback information codebook according to the trigger signaling, wherein a manner in which the first feedback mode determines the feedback information codebook is different from a manner in which the second feedback mode determines the feedback information codebook.

Specifically, the first feedback mode is that the feedback information codebook includes feedback information corresponding to at least one downlink transmission channel or downlink transmission resource indicated by the trigger signaling. That is, the terminal device can determine the at least one downlink transmission channel or downlink transmission resource according to the trigger signaling, and then determine the feedback information codebook.

Optionally, in the first feedback mode, the trigger signaling may be used for indicating at least one downlink transmission channel group or downlink transmission resource group, the at least one downlink transmission channel group or downlink transmission resource group may include the at least one downlink transmission channel or downlink transmission resource, and each of the downlink transmission channel group or downlink transmission resource group may include one or more downlink transmission channels or downlink transmission resources.

Optionally, in the first feedback mode, if the trigger signaling is used for indicating the at least one downlink transmission channel group or downlink transmission resource group, in the feedback information codebook, the feedback information corresponding to the at least one downlink transmission channel or downlink transmission resource may be arranged in a sequence of serial numbers of the at least one downlink transmission channel group or downlink transmission resource group, rather than in a receiving sequence.

In an embodiment of the present disclosure, the second feedback mode is that the feedback information codebook is a full codebook. Optionally, the terminal device may determine a maximum number of HARQ processes that can be supported, and then determine the feedback information codebook according to the maximum number of the supported HARQ processes. For example, the feedback information codebook may include the feedback information corresponding to all the HARQ processes that can be supported.

Optionally, the terminal device may also determine a maximum number of HARQ processes according to the configuration of a network device. For example, the terminal device receives configuration information sent by the network device and determines the maximum number of HARQ processes according to the configuration information. The terminal device then determines the feedback information codebook according to the maximum number of HARQ processes configured by the network device. For example, the feedback information codebook may include the feedback information corresponding to all the HARQ processes configured by the network device.

It should be understood that in the second feedback mode, if the terminal device determines the feedback information codebook according to the HARQ process that can be supported, or determines the feedback information codebook according to the HARQ process configured by the network device, the feedback information in the determined feedback information codebook may be arranged in a sequence of serial numbers of the HARQ processes (HARQ process indexes), rather than in a receiving sequence or other sequences, but the embodiments of the present disclosure are not limited thereto.

Optionally, in the second feedback mode, the terminal device may also determine the feedback information codebook according to a maximum number of supported downlink transmission channel groups or downlink transmission resource groups. Specifically, the terminal device can determine the number of downlink transmission channel groups or downlink transmission resource groups that can be supported, and the number of downlink transmission channels or downlink transmission resources included in each downlink transmission channel group or downlink transmission resource group, and then determine the number of downlink transmission channels or downlink transmission resources that can be supported by the terminal device. Then the terminal device can determine that the feedback information codebook includes the feedback information corresponding to all the supported downlink transmission channel groups or downlink transmission resource groups, for example, the feedback information corresponding to all downlink transmission channels or downlink transmission resources that can be supported.

It should be understood that in the second feedback mode, if the terminal device determines the feedback information codebook according to the maximum number of supported downlink transmission channel groups or downlink transmission resource groups, the sequence of the feedback information in the determined feedback information codebook may be arranged in a sequence of serial numbers of the downlink transmission channel groups or the downlink transmission resource groups, rather than in a receiving sequence or other sequences, but the embodiments of the present disclosure are not limited thereto.

It should be understood that the embodiments of the present disclosure can be applied to the unlicensed spectrum, or can also be applied to the licensed spectrum, and the embodiments of the present disclosure are not limited thereto.

In an embodiment of the present disclosure, before the S210, the method 200 may further include receiving, by the terminal device, a downlink transmission channel or a downlink transmission resource sent by a network device. The downlink transmission channel may include a downlink physical shared channel and/or a downlink physical control channel. Specifically, the network device sends at least one downlink transmission channel or at least one downlink transmission resource to the terminal device, and the terminal device may receive information for a part or all of the at least one downlink transmission channel, or the terminal device may not receive any information for the at least one downlink transmission channel. Alternatively, the terminal device may receive information for a part or all of the at least one downlink transmission resource, or the terminal device may not receive any information for the at least one downlink transmission resource.

Therefore, in the S210, the terminal device receives the trigger signaling. For example, the trigger signaling may be sent by the network device 110 in FIG. 1 to the terminal 120. The trigger signaling is used for triggering the terminal device to send the feedback information, and the feedback information is feedback information corresponding to the downlink transmission channel or downlink transmission resource received by the terminal device.

In the S220, the terminal device determines to use the first feedback mode or the second feedback mode to send the feedback information codebook according to the trigger signaling. Specifically, the trigger signaling may include a first information field, and if the first information field is a first preset value, the terminal device chooses to use the first feedback mode to determine the feedback information codebook; or, if the first information field is a second preset value, the terminal device chooses to use the second feedback mode to determine the feedback information codebook. Either the first preset value or the second preset value may represent one or more numerical values, which is not limited by the embodiments of the present disclosure.

A method for determining a feedback mode according to the trigger signaling by the terminal device will be described in detail with respect to different meanings of the first information field by referring to specific embodiments below.

Optionally, as a first embodiment, if the first information field is the first preset value, the terminal device may not only determine to adopt the first feedback mode, but also determine the feedback information in the feedback information codebook according to the first information field. For example, the first preset value may be used for indicating information for the at least one downlink transmission channel group or downlink transmission resource group.

For example, it is assumed that the terminal device supports 16 HARQ processes at most, and the terminal device also supports 4 downlink transmission channel groups at most. Each downlink transmission channel group may include one or more downlink transmission channels. Corresponding to that the terminal device supports 4 downlink transmission channel groups at most, each downlink transmission channel group can correspond to one or more bit representations. It is assumed here that each downlink transmission channel group uses one bit representation correspondingly, and thus the first information field can be composed of 4 bits of information. For example, the first information field can be represented as {b1, b2, b3, b4}, and the 4 downlink transmission channel groups are indicated in a bitmap manner.

Corresponding to a case where the first information field is the first preset value, it is assumed here that the {b1, b2, b3, b4} has at least one bit position 1, but {b1, b2, b3, b4} is not all 1, which is the first preset value. At this time, the terminal device determines to adopt the first feedback mode. Specifically, the terminal device may also determine which downlink transmission channel groups with feedback information that needs to be fed back according to the specific values of {b1, b2, b3, b4}. For example, if bi in {b1, b2, b3, b4} is 1, it can be used for indicating that the feedback information of the i-th downlink transmission channel group corresponding to the bi needs to be fed back. For example, the feedback information can be ACK/NACK information, and i can take any value from 1 to 4.

For example, FIG. 4 shows a schematic diagram of a downlink transmission channel and feedback information according to an embodiment of the present disclosure. As shown in FIG. 4, it is assumed that the first information field in the trigger signaling is {1,1,0,0} the terminal device determines to adopt the first feedback mode. Correspondingly, the terminal device may also determine that the feedback information codebook includes feedback information of a first downlink transmission channel group and a second downlink transmission channel group according to the first information field.

It should be understood that the terminal device can group the downlink transmission channels in various ways. For example, the grouping of the downlink transmission channels may be as shown in FIG. 4, and the principle for grouping the downlink transmission channels may be independent of the serial numbers of the HARQ processes. The HARQ process numbers corresponding to multiple downlink channels in each of the downlink transmission channel groups may be dynamically allocated by the network device, and the result may be randomly distributed, for example, as shown in FIG. 5. Alternatively, the grouping result may also be related to the HARQ process numbers. For example, the HARQ process numbers corresponding to the first downlink transmission channel group are 1 to 4, and the HARQ process numbers corresponding to the second downlink transmission channel group are 2 to 8, and the embodiment of the present disclosure is not limited thereto.

In addition, the terminal device may also determine the feedback information for the first downlink transmission channel group and the second downlink transmission channel group in various ways. For example, it is assumed that each downlink transmission channel group received by the terminal device includes 4 PDSCHs at most, and the numbers of PDSCHs actually included in the first downlink transmission channel group, the second downlink transmission channel group and the third downlink transmission channel group are shown in FIG. 4, the feedback information codebook determined by the terminal device can be $\{b_{G1,1}, b_{G1,2}, b_{G1,3}, b_{G1,4}, b_{G2,1}, b_{G2,2}, b_{G2,3}, 0\}$ or $\{b_{G1,1}, b_{G1,2}, b_{G1,3}, b_{G1,4}, b_{G2,1}, b_{G2,2}, b_{G2,3}\}$, where $b_{Gi,j}$ represents ACK/NACK information corresponding to a j-th PDSCH in the downlink transmission channel group i. Alternatively, the terminal device may also feed back the feedback information of the first downlink transmission channel group and the second downlink transmission channel group in other ways, which is not limited by the embodiments of the present disclosure.

Optionally, in the first feedback mode, the feedback information codebook may arrange the corresponding feedback information in the sequence of serial numbers of the downlink transmission channel groups, rather than in a sequence of transmission time of the downlink transmission channels. As shown in FIG. 4, although the transmission time of the downlink transmission channel group 1 is after that of the group 2, the ACK/NACK information corresponding to the group 1 is arranged before the ACK/NACK information corresponding to the group 2 in the feedback information codebook, but the embodiments of the present disclosure is not limited thereto.

Conversely, it is assumed that {b1, b2, b3, b4} are all 1, which indicates that the first information field is the second preset value, then the terminal device determines to use the second feedback mode to send feedback information, and the feedback information is the ACK/NACK information.

For example, FIG. 5 shows another schematic diagram of a downlink transmission channel and feedback information according to an embodiment of the present disclosure. As shown in FIG. 5, it is assumed that the first information field is {1,1,1,1}, then the terminal device determines to use the second feedback mode. For example, the terminal device may determine that the feedback information codebook includes the ACK/NACK information corresponding to all 16 HARQ processes that the terminal device can support, and the feedback information codebook may be $\{b_{p1}, b_{p2}, b_{p3}, \ldots, b_{p16}\}$, where bpi represents the ACK/NACK information corresponding to the process i. Optionally, bpi may be one-bit information or multi-bit information. For example, when the terminal device is configured so that one PDSCH carries 2 transmission blocks at most, bpi may correspondingly include two-bit information; and when the terminal device is configured so that one PDSCH includes N coding blocks at most, bpi may correspondingly include N-bit information.

It should be understood that the above description takes the downlink transmission channel as an example, which is also applicable to the downlink transmission resource. For the sake of brevity, details thereof will not be repeated here.

The grouping manner of the downlink transmission resources and the grouping manner of the downlink transmission channels may be the same or different. For example, the downlink transmission resources or the downlink transmission channels can be grouped according to a channel occupation time (COT).

Specifically, by taking the grouping of downlink transmission resources as an example, the terminal device may group the downlink transmission resources according to the COTs where the downlink transmission resources are located. For example, the terminal device may determine that the downlink transmission resources located in the same COT belong to the same downlink transmission resource group; for another example, the terminal device may also determine that the downlink transmission resources in multiple COTs belong to the same downlink transmission resource group. However, the embodiments of the present disclosure are not limited thereto.

Optionally, as a second embodiment, the trigger signaling may further include a second information field, and if the first information field is the first preset value, the terminal device determines to adopt the first feedback mode to determine the feedback information codebook according to the first information field, and may also determine information for the at least one downlink transmission channel group or downlink transmission resource group included in the feedback information codebook according to the second information field.

For example, it is still assumed here that the terminal device supports 16 HARQ processes at most, and the terminal device also supports 4 downlink transmission channel groups at most. Each downlink transmission channel group may include one or more downlink transmission channels. It is assumed that the first information field consists of 1-bit information, which is represented as {b0}, the first information field can be used for indicating the first feedback mode or the second feedback mode.

For example, corresponding to a case where the first information field is the first preset value, it is assumed herein that the value of {b0} is 0, which is the first preset value, and then the terminal device determines to adopt the first feedback mode. Specifically, the terminal device may determine the feedback information codebook according to the second information field in the trigger signaling.

For the second information field, corresponding to 4 downlink transmission channel groups supported by the terminal device at most, each downlink transmission channel group may correspond to one or more bit representations. It is assumed here that each downlink transmission channel group uses one bit representation correspondingly, the second information field can be composed of 4 bits of information. For example, the second information field can be represented as {b1, b2, b3, b4}, and the 4 downlink transmission channel groups are indicated in a bitmap manner. The terminal uses the first feedback mode to send the feedback information according to the indication of {b1, b2, b3, b4}. For example, the feedback information may be the ACK/NACK information. If the bi in {b1, b2, b3, b4} is 1, it can be used for indicating that the ACK/NACK information of the i-th downlink transmission channel group corresponding to the bi needs to be fed back, and i can take any value from 1 to 4.

For example, FIG. 4 shows a schematic diagram of a downlink transmission channel and feedback information according to an embodiment of the present disclosure. As shown in FIG. 4, it is assumed that the second information field in the trigger signaling is {1,1,0,0} then the terminal device determines that the feedback information codebook includes the feedback information of the first downlink transmission channel group and the second downlink transmission channel group.

It should be understood that, similar to the first embodiment, the terminal device can also group the downlink transmission channels in various ways. For example, the grouping of the downlink transmission channels is shown in FIG. 4. The terminal device can also determine the feedback information of the first downlink transmission channel group and the second downlink transmission channel group in various ways, which will not be repeated here for the sake of brevity.

Conversely, for a case where the first information field is the second preset value, it is assumed herein that the value of {b0} is 0, which is the second preset value, and then the terminal device determines to adopt the second feedback mode. Specifically, the terminal device may determine the feedback information codebook corresponding to the second feedback mode according to the method in the first embodiment. For brevity, details thereof are not described herein again.

It should be understood that for any one of the downlink transmission channels or any one of the downlink transmission resources in the above two embodiments, the first downlink transmission channel is taken as an example here, if a time interval between an end time of the first downlink transmission channel and a start time of sending the feedback information codebook is less than or equal to a first preset time, feedback information corresponding to the first downlink transmission channel is the NACK information or the occupancy information; alternatively, the first downlink transmission resource is taken as an example, if a time interval between an end time of the first downlink transmission resource and a start time of sending the feedback information codebook is less than or equal to the first preset time, feedback information corresponding to the first downlink transmission resource is the NACK information or the occupancy information.

For example, PDSCH1 in the third downlink transmission channel group in FIG. 4 is taken as an example. Regardless of whether the first feedback mode or the second feedback mode is used, if the PDSCH 1 in the third downlink transmission channel group needs to be fed back, it is assumed that a time interval between an end time of the PDSCH 1 in the third downlink transmission channel group and a start time of a physical uplink control channel (PUCCH) corresponding to the feedback information codebook is $T_{31}$, and the $T_{31}$ is less than or equal to the first preset time, for example, as shown in FIG. 4, $T_{31}$<the first preset time, then the feedback information corresponding to PDSCH 1 in the third downlink transmission channel group is the NACK information or the occupancy information.

In addition, for any downlink transmission channel or any downlink transmission resource in the above two embodiments, the second downlink transmission channel is taken as an example here. If the terminal device does not receive the second downlink transmission channel, the feedback information corresponding to the second downlink transmission channel is the NACK information or the occupancy information; or, the second downlink transmission resource is taken as an example, if the terminal device does not receive the downlink transmission in the second downlink transmission resource, the feedback information corresponding to the second downlink transmission resource is the NACK information or the occupancy information.

For example, PDSCH 3 in the second downlink transmission channel group in FIG. 4 is taken as an example. Regardless of whether the first feedback mode or the second feedback mode is used, if the PDSCH 3 in the second downlink transmission channel group needs to be fed back, it is assumed that the terminal device does not receive the PDSCH 3 in the second downlink transmission channel group, then the feedback information corresponding to PDSCH 1 in the third downlink transmission channel group is the NACK information or the occupancy information.

Both the above first downlink transmission channel and second downlink transmission channel may be set as the NACK information or the occupancy information, but a condition of the first downlink transmission channel and a condition of the second downlink transmission channel are different, and thus the network device side cannot determine which condition the first downlink transmission channel and the second downlink transmission channel belong to respectively, therefore, the terminal device does not expect a case where the first downlink transmission channel needs to be fed back. Similarly, the terminal device does not expect a case where the first downlink transmission resource needs to be fed back.

It should be understood that for any HARQ process in the embodiments of the present disclosure, the first HARQ process is taken as an example here, and if a time interval between an end time of the first HARQ process and a start time of sending the feedback information codebook is less than or equal to a second preset time, the feedback information corresponding to the first HARQ process is the NACK information or the occupancy information.

For example, the HARQ process 2 in FIG. 5 is taken as an example, that is, the PDSCH 1 in the third downlink transmission channel group is taken as an example. If the second feedback mode is adopted, the feedback information of the downlink transmission channel corresponding to the HARQ process 2 needs to be fed back. it is assumed that a time interval between an end time of the downlink transmission channel corresponding to the HARQ process 2 and a start time of the PUCCH corresponding to the feedback information codebook is $T_2$, and the $T_2$ is less than or equal to the second preset time, for example, as shown in FIG. 5, $T_2$<the second preset time, then the feedback information corresponding to the downlink transmission channel corresponding to the HARQ process 2 is the NACK information or the occupancy information.

In addition, for any HARQ process in the embodiments of the present disclosure, the second HARQ process is taken as an example herein, and if the terminal device does not receive the second HARQ process, the feedback information corresponding to the second HARQ process is the NACK information or the occupancy information. For example, the HARQ process 12 in FIG. 5 is taken as an example, that is, the PDSCH 3 in the second downlink transmission channel group in FIG. 4 is taken as an example. If the second feedback mode is adopted, the feedback information of the downlink transmission channel corresponding to the HARQ process 12 needs to be fed back. It is assumed that the terminal device does not receive the downlink transmission channel corresponding to the HARQ process 12, the feedback information of the downlink transmission channel corresponding to the HARQ process 12 is the NACK information or the occupancy information.

Both the above first HARQ process and second HARQ process may be set as the NACK information or the occupancy information, but a condition of the first HARQ process and a condition of the second HARQ process are different, and thus the network device side cannot determine which condition the first HARQ process and the second HARQ process belong to respectively. Therefore, the terminal device does not expect a case where the first HARQ process needs to be fed back.

It should be understood that the first preset value and the second preset value in the embodiments of the present disclosure can be set according to actual applications. For example, they may be set according to the processing delay of the downlink transmission channel or downlink transmission resource, however the embodiments of the present disclosure are not limited thereto.

Therefore, in the method for transmitting feedback information in the embodiments of the present disclosure, the terminal device determines which feedback mode to be used to transmit the feedback information codebook according to the trigger signaling, so that it may ensure to achieve that the feedback information is triggered based on the downlink transmission channel group/resource group without additionally increasing indication information for the downlink transmission channel group/resource group in the downlink control signaling. When all downlink transmission channels/resources have corresponding group information, the terminal device can determine the feedback information codebook according to the group information indicated in the trigger signaling, which can avoid existence of redundant information in the feedback codebook. When a certain downlink transmission channel/resource does not have the group information, the terminal device may be dynamically instructed to use the feedback mode for the full codebook to transmit the feedback information to ensure that the feedback information corresponding to all downlink transmission channels/resources may be transmitted, thereby ensuring the downlink transmission efficiency.

The method for transmitting feedback information according to the embodiments of the present disclosure are described above in detail from the perspective of the terminal device in connection with FIGS. 1 to 5, respectively. A method for transmitting feedback information according to the embodiments of the present disclosure will be described below from the perspective of the network device in connection with FIG. 6.

FIG. 6 shows a schematic flowchart of a method 300 for transmitting feedback information according to an embodiment of the present disclosure. The method 300 may be executed by the network device shown in FIG. 1. Specifically, for example, the network device is the network device shown in FIG. 1. As shown in FIG. 6, the method 300 includes S310, sending, by the network device, trigger signaling, wherein the trigger signaling is used for triggering a terminal device to send a feedback information codebook, and the feedback information codebook is sent by using a first feedback mode or a second feedback mode. A manner in which the first feedback mode determines the feedback information codebook is different from a manner in which the second feedback mode determines the feedback information codebook.

Specifically, the first feedback mode is that the feedback information codebook includes feedback information of at least one downlink transmission channel or downlink transmission resource indicated by the trigger signaling, and the second feedback mode is that the feedback information codebook is a full codebook.

Optionally, as an embodiment, in the first feedback mode, the trigger signaling is used for indicating at least one downlink transmission channel group or downlink transmission resource group, and the at least one downlink transmission channel group or downlink transmission resource group includes the at least one downlink transmission channel or downlink transmission resource.

Optionally, as an embodiment, the second feedback mode includes that the feedback information codebook is determined by the terminal device according to a maximum number of supported hybrid automatic repeat request (HARQ) processes, and the feedback information codebook includes feedback information corresponding to all HARQ processes supported by the terminal device.

Optionally, as an embodiment, the second feedback mode includes that the feedback information codebook is determined by the terminal device according to a maximum number of HARQ processes configured by the network device, and the feedback information codebook includes feedback information corresponding to all HARQ processes configured by the network device.

Optionally, as an embodiment, the second feedback mode includes that the feedback information codebook is determined by the terminal device according to a maximum number of supported downlink transmission channel groups or downlink transmission resource groups, and the feedback information codebook includes feedback information corresponding to all downlink transmission channel groups or downlink transmission resource groups supported by the terminal device.

Optionally, as an embodiment, the trigger signaling includes a first information field, and if the first information field is a first preset value, the first information field is used for the terminal device to determine to use the first feedback mode to send the feedback information codebook; or, if the first information field is a second preset value, the first information field is used for the terminal device to determine to use the second feedback mode to send the feedback information codebook.

Optionally, as an embodiment, if the first information field is the first preset value, the first preset value is used for indicating information for the at least one downlink transmission channel group or downlink transmission resource group.

Optionally, as an embodiment, the trigger signaling includes a second information field, and if the first information field is the first preset value, the second information field is used for indicating information for the at least one downlink transmission channel group or downlink transmission resource group.

Optionally, as an embodiment, if a time interval between an end time of a first downlink transmission channel or downlink transmission resource and a start time of sending the feedback information codebook is less than or equal to a first preset time, feedback information corresponding to the first downlink transmission channel or downlink transmission resource is the negative acknowledgement (NACK) information or the occupancy information, and the first downlink transmission channel or downlink transmission resource is any downlink transmission channel or downlink transmission resource received by the terminal device.

Optionally, as an embodiment, if a second downlink transmission channel is not received by the terminal device, feedback information corresponding to the second downlink transmission channel is the NACK information or the occupancy information; or if downlink transmission is not received by the terminal device in a second downlink transmission resource, feedback information corresponding to the second downlink transmission resource is the NACK information or the occupancy information.

Optionally, as an embodiment, if a time interval between an end time of a first HARQ process received by the terminal device and a start time of sending the feedback information codebook is less than or equal to a second preset time, feedback information corresponding to the first HARQ process is NACK information or occupancy information.

Optionally, as an embodiment, if a second HARQ process is not received by the terminal device, feedback information corresponding to the second HARQ process is the NACK information or the occupancy information.

Optionally, as an embodiment, in the first feedback mode, feedback information of the at least one downlink transmission channel or downlink transmission resource in the feedback information codebook is arranged according to a sequence of serial numbers of the at least one downlink transmission channel group or downlink transmission resource group.

Optionally, as an embodiment, in the second feedback mode, feedback information in the feedback information codebook is arranged in a sequence of serial numbers of HARQ processes; alternatively, the feedback information in the feedback information codebook is arranged according to a sequence of serial numbers of the downlink transmission channel groups or the downlink transmission resource groups.

Therefore, in the method for transmitting feedback information in the embodiments of the present disclosure, the network device sends the trigger signaling to the terminal device, so that the terminal device determines which feedback mode to be used to transmit the feedback information codebook according to the trigger signaling, which may ensure to achieve that the feedback information is triggered based on the downlink transmission channel group/resource group without additionally increasing indication information for the downlink transmission channel group/resource group in the downlink control signaling. When all downlink transmission channels/resources have corresponding group information, the terminal device can determine the feedback information codebook according to the group information indicated in the trigger signaling, which can avoid existence of redundant information in the feedback codebook. When a certain downlink transmission channel/resource does not have the group information, the terminal device may be dynamically instructed to use the feedback mode for the full codebook to transmit the feedback information to ensure that the feedback information corresponding to all downlink transmission channels/resources may be transmitted, thereby ensuring the downlink transmission efficiency.

It should be understood that in various embodiments of the present disclosure, the serial numbers of the above processes do not mean the performing order thereof, and the performing order of the processes should be determined based on the functions and inherent logic thereof, which should not be construed as any limitation on implementation processes of the embodiments of the present disclosure.

In addition, the term "and/or" used herein is merely to describe a relative relationship of the related objects, indicating that there can be three relationships. For example, as for A and/or B, it can indicate three cases where A exists alone, A and B exist simultaneously, and B exists alone. In addition, the character "/" used herein generally indicates that the related objects before and after "/" are in an "or" relationship.

The methods for transmitting feedback information according to the embodiments of the present disclosure are described above in detail with reference to FIGS. 1 to 6, and the terminal device and the network device according to the embodiments of the present disclosure will be described below with reference to FIGS. 7 to 11.

As shown in FIG. 7, a terminal device 400 according to an embodiment of the present disclosure includes a processing unit 410 and a transceiving unit 420. Specifically, the transceiving unit 420 is configured to receive trigger signaling, and the trigger signaling is used for triggering the terminal device to send feedback information; and the processing unit 410 is configured to determine to use a first feedback mode or a second feedback mode to send a feedback information codebook according to the trigger signaling.

The first feedback mode is that the feedback information codebook includes feedback information corresponding to at least one downlink transmission channel or downlink transmission resource indicated by the trigger signaling, and the second feedback mode is that the feedback information codebook is a full codebook.

Optionally, as an embodiment, in the first feedback mode, the trigger signaling is used for indicating at least one downlink transmission channel group or downlink transmission resource group, and the at least one downlink transmission channel group or downlink transmission resource group includes the at least one downlink transmission channel or downlink transmission resource.

Optionally, as an embodiment, the second feedback mode includes that the feedback information codebook is determined according to a maximum number of supported hybrid automatic repeat request (HARQ) processes, and the feedback information codebook includes feedback information corresponding to all supported HARQ processes.

Optionally, as an embodiment, the second feedback mode includes that the feedback information codebook is determined according to a maximum number of HARQ processes configured by a network device, and the feedback information codebook includes feedback information corresponding to all HARQ processes configured by the network device.

Optionally, as an embodiment, the second feedback mode includes that the feedback information codebook is determined according to a maximum number of supported downlink transmission channel groups or downlink transmission resource groups, and the feedback information codebook includes feedback information corresponding to all supported downlink transmission channel groups or downlink transmission resource groups.

Optionally, as an embodiment, the trigger signaling includes a first information field, and the processing unit 410 is configured to determine to use the first feedback mode to send the feedback information codebook if the first information field is a first preset value; or determine to use the second feedback mode to send the feedback information codebook if the first information field is a second preset value.

Optionally, as an embodiment, if the first information field is the first preset value, the first preset value is used for indicating information for the at least one downlink transmission channel group or downlink transmission resource group.

Optionally, as an embodiment, the trigger signaling includes a second information field, and if the first information field is the first preset value, the second information field is used for indicating information for the at least one downlink transmission channel group or downlink transmission resource group.

Optionally, as an embodiment, if a time interval between an end time of a first downlink transmission channel or downlink transmission resource and a start time of sending the feedback information codebook is less than or equal to a first preset time, feedback information corresponding to the first downlink transmission channel or downlink transmission resource is the negative acknowledgement (NACK) information or the occupancy information, and the first downlink transmission channel or downlink transmission resource is any downlink transmission channel or downlink transmission resource received by the terminal device.

Optionally, as an embodiment, if a second downlink transmission channel is not received by the terminal device, feedback information corresponding to the second downlink transmission channel is the NACK information or the occupancy information; or if downlink transmission is not received by the terminal device in a second downlink transmission resource, feedback information corresponding to the second downlink transmission resource is the NACK information or the occupancy information.

Optionally, as an embodiment, if a time interval between an end time of a first HARQ process received by the terminal device and a start time of sending the feedback information codebook is less than or equal to a second preset time, feedback information corresponding to the first HARQ process is NACK information or occupancy information.

Optionally, as an embodiment, if a second HARQ process is not received by the terminal device, feedback information corresponding to the second HARQ process is the NACK information or the occupancy information.

Optionally, as an embodiment, in the first feedback mode, feedback information of the at least one downlink transmission channel or downlink transmission resource in the feedback information codebook is arranged according to a sequence of serial numbers of at least one downlink transmission channel group or downlink transmission resource group.

Optionally, as an embodiment, in the second feedback mode, feedback information in the feedback information codebook is arranged in a sequence of serial numbers of HARQ processes; alternatively, the feedback information in the feedback information codebook is arranged according to a sequence of serial numbers of the downlink transmission channel groups or the downlink transmission resource groups.

It should be understood that the terminal device 400 according to the embodiment of the present disclosure can correspondingly perform the method 200 in the embodiments of the present disclosure, and the above-mentioned and other operations and/or functions of each unit in the terminal device 400 are respectively for implementing the corresponding process of the terminal device in the methods shown in FIGS. 1 to 6 and will not be repeated here for the sake of brevity.

Therefore, the terminal device of the embodiments of the present disclosure determines which feedback mode to be used to transmit the feedback information codebook according to the received trigger signaling, which may ensure to achieve that the feedback information is triggered based on the downlink transmission channel group/resource group without additionally increasing indication information for the downlink transmission channel group/resource group in the downlink control signaling. When all downlink transmission channels/resources have corresponding group information, the terminal device can determine the feedback information codebook according to the group information indicated in the trigger signaling, which can avoid existence of redundant information in the feedback codebook. When a certain downlink transmission channel/resource does not have the group information, the terminal device may be dynamically instructed to use the feedback mode for the full codebook to transmit the feedback information to ensure that the feedback information corresponding to all downlink transmission channels/resources may be transmitted, thereby ensuring the downlink transmission efficiency.

Figure 8:
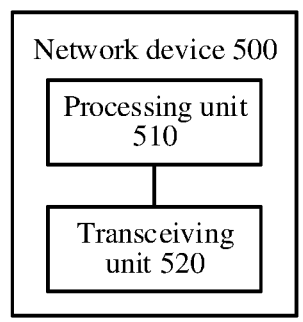
FIG. 8 is a schematic block diagram of a network device provided by an embodiment of the present disclosure.

As shown in FIG. 8, a network device 500 according to an embodiment of the present disclosure includes a processing unit 510 and a transceiving unit 520. Specifically, the processing unit 510 may be configured to generate trigger signaling; and the transceiving unit 520 is configured to send the trigger signaling, and the trigger signaling is used for triggering a terminal device to send a feedback information codebook, and the feedback information codebook is sent by using a first feedback mode or a second feedback mode;

The first feedback mode is that the feedback information codebook includes feedback information of at least one downlink transmission channel or downlink transmission resource indicated by the trigger signaling, and the second feedback mode is that the feedback information codebook is a full codebook.

Optionally, as an embodiment, in the first feedback mode, the trigger signaling is used for indicating at least one downlink transmission channel group or downlink transmission resource group, and the at least one downlink transmission channel group or downlink transmission resource group includes the at least one downlink transmission channel or downlink transmission resource.

Optionally, as an embodiment, the second feedback mode includes that the feedback information codebook is determined by the terminal device according to a maximum number of supported hybrid automatic repeat request (HARQ) processes, and the feedback information codebook includes feedback information corresponding to all HARQ processes supported by the terminal device.

Optionally, as an embodiment, the second feedback mode includes that the feedback information codebook is determined by the terminal device according to a maximum number of HARQ processes configured by the network device, and the feedback information codebook includes feedback information corresponding to all HARQ processes configured by the network device.

Optionally, as an embodiment, the second feedback mode includes that the feedback information codebook is determined by the terminal device according to a maximum number of supported downlink transmission channel groups or downlink transmission resource groups, and the feedback information codebook includes feedback information corresponding to all downlink transmission channel groups or downlink transmission resource groups supported by the terminal device.

Optionally, as an embodiment, the trigger signaling includes a first information field, and if the first information field is a first preset value, the first information field is used for the terminal device to use the first feedback mode to send the feedback information codebook; or if the first information field is a second preset value, the first information field is used for the terminal device to use the second feedback mode to send the feedback information codebook.

Optionally, as an embodiment, if the first information field is the first preset value, the first preset value is used for indicating information for the at least one downlink transmission channel group or downlink transmission resource group.

Optionally, as an embodiment, the trigger signaling includes a second information field, and if the first information field is the first preset value, the second information field is used for indicating information for the at least one downlink transmission channel group or downlink transmission resource group.

Optionally, as an embodiment, if a time interval between an end time of a first downlink transmission channel or downlink transmission resource and a start time of sending the feedback information codebook is less than or equal to a first preset time, feedback information corresponding to the first downlink transmission channel or downlink transmission resource is the negative acknowledgement (NACK) information or the occupancy information, and the first downlink transmission channel or downlink transmission resource is any downlink transmission channel or downlink transmission resource received by the terminal device.

Optionally, as an embodiment, if a second downlink transmission channel is not received by the terminal device, feedback information corresponding to the second downlink transmission channel is the NACK information or the occupancy information; or if downlink transmission is not received by the terminal device in a second downlink transmission resource, feedback information corresponding to the second downlink transmission resource is the NACK information or the occupancy information.

Optionally, as an embodiment, if a time interval between an end time of a first HARQ process received by the terminal device and a start time of sending the feedback information codebook is less than or equal to a second preset time, feedback information corresponding to the first HARQ process is NACK information or occupancy information.

Optionally, as an embodiment, if a second HARQ process is not received by the terminal device, feedback information corresponding to the second HARQ process is the NACK information or the occupancy information.

Optionally, as an embodiment, in the first feedback mode, feedback information of the at least one downlink transmission channel or downlink transmission resource in the feedback information codebook is arranged according to a sequence of serial numbers of at least one downlink transmission channel group or downlink transmission resource group.

Optionally, as an embodiment, in the second feedback mode, feedback information in the feedback information codebook is arranged in a sequence of serial numbers of HARQ processes; alternatively, the feedback information in the feedback information codebook is arranged according to a sequence of serial numbers of the downlink transmission channel groups or the downlink transmission resource groups.

It should be understood that the network device 500 according to the embodiments of the present disclosure can be correspondingly configured to perform the method 300 in the embodiments of the present disclosure, and the above-mentioned and other operations and/or functions of each unit in the network device 500 are respectively for implementing the corresponding process of the network device in the methods shown in FIGS. 1-6, which will not be repeated here for the sake of brevity.

Therefore, the network device in the embodiments of the present disclosure sends the trigger signaling to the terminal device, so that the terminal device determines which feedback mode to be used to transmit the feedback information codebook according to the trigger signaling, which may ensure to achieve that the feedback information is triggered based on the downlink transmission channel group/resource group without additionally increasing indication information for the downlink transmission channel group/resource group in the downlink control signaling. When all downlink transmission channels/resources have corresponding group information, the terminal device can determine the feedback information codebook according to the group information indicated in the trigger signaling, which can avoid existence of redundant information in the feedback codebook. When a certain downlink transmission channel/resource does not have the group information, the terminal device may be dynamically instructed to use the feedback mode for the full codebook to transmit the feedback information to ensure that the feedback information corresponding to all downlink transmission channels/resources may be transmitted, thereby ensuring the downlink transmission efficiency.

Figure 9:
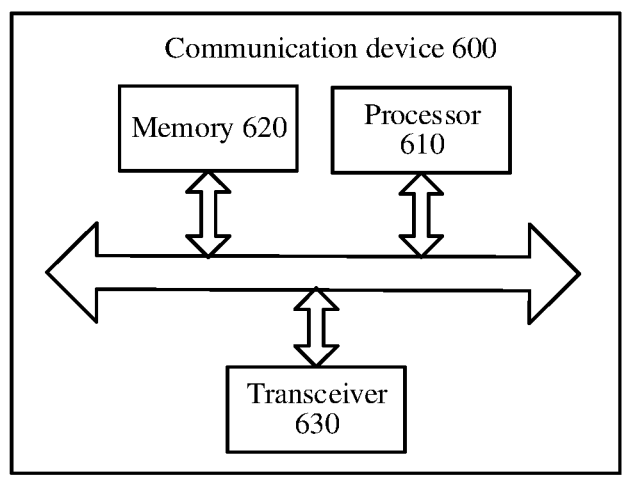
FIG. 9 is a schematic block diagram of a communication device provided by an embodiment of the present disclosure.

FIG. 9 is a schematic structural diagram of a communication device 600 according to an embodiment of the present disclosure. The communication device 600 shown in FIG. 9 includes a processor 610, and the processor 610 may invoke a computer program from a memory and run the computer program, to implement the method in the embodiments of the present disclosure.

Optionally, as shown in FIG. 9, the communication device 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

Optionally, as shown in FIG. 9, the communication device 600 may further include a transceiver 630, and the processor 610 may control the transceiver 630 to communicate with another device, and specifically, the transceiver 630 may transmit information or data to another device, or receive information or data transmitted by another device.

The transceiver 630 may include a transmitter and a receiver. The transceiver 630 may further include an antenna. There may be one or more antennas.

Optionally, the communication device 600 may be the network device in the embodiments of the present disclosure, and the communication device 600 can implement corresponding procedures implemented by the network device in various methods in the embodiments of the present disclosure. For brevity, details thereof are not described herein again.

Optionally, the communication device 600 may be the mobile terminal/terminal in the embodiments of the present disclosure, and the communication device 600 can implement corresponding procedures implemented by the mobile terminal/terminal device in various methods in the embodiments of the present disclosure. For brevity, details thereof are not described herein again.

Figure 10:
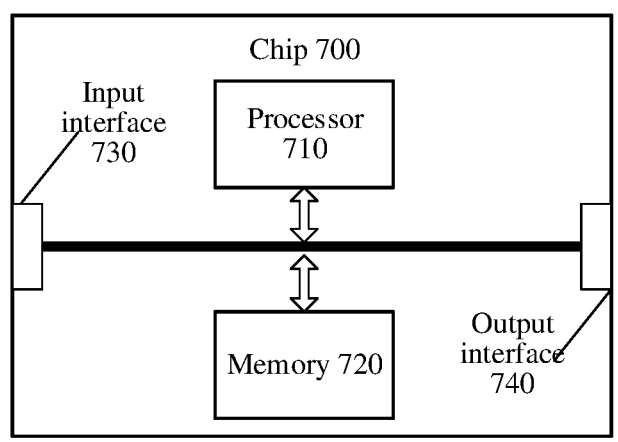
FIG. 10 is a schematic block diagram of a chip provided by an embodiment of the present disclosure.

Optionally, an embodiment of the present disclosure also proposes a device, which may include a processor, configured to call and run a computer program from a memory, so that an apparatus installed with the device executes the foregoing various methods. The device may be a chip. For example, FIG. 10 is a schematic structural diagram of a chip in an embodiment of the present disclosure. The chip 700 shown in FIG. 10 includes a processor 710, and the processor 710 may invoke a computer program from a memory and run the computer program, to implement the method in the embodiments of the present disclosure.

Optionally, as shown in FIG. 10, the chip 700 may further include a memory 720. The processor 710 may invoke the computer program from the memory 720 and run the computer program, to implement the method in the embodiments of the present disclosure.

The memory 720 may be a component independent of the processor 710, or may be integrated into the processor 710.

Optionally, the chip 700 may further include an input interface 730. The processor 710 may control the input interface 730 to communicate with another device or chip, and specifically, to obtain information or data transmitted by another device or chip.

Optionally, the chip 700 may further include an output interface 740. The processor 710 may control the output interface 740 to communicate with another device or chip, and specifically, to output information or data to another device or chip.

Optionally, the chip may be applied in the network device according to embodiments of the present disclosure, and the chip can implement corresponding procedures implemented by the network device in various methods in the embodiments of the present disclosure. For brevity, details thereof are not described herein again.

Optionally, the chip may be applied to the mobile terminal/terminal device in the embodiments of the present disclosure, and the chip can implement corresponding procedures implemented by the mobile terminal/terminal device in various methods in the embodiments of the present disclosure. For brevity, details thereof are not described herein again.

It should be noted that, the chip mentioned in the embodiments of the present disclosure may also be referred to as a system-level chip, a system chip, a chip system, a system on chip, or the like.

Figure 11:
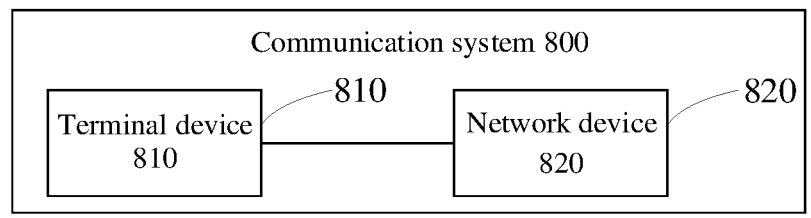
FIG. 11 is a schematic diagram of a communication system provided by an embodiment of the present disclosure.

FIG. 11 is a schematic structural diagram of a communication system 800 according to an embodiment of the present disclosure. The communication system 800 shown in FIG. 11 includes a terminal device 810 and a network device 820.

The terminal device 810 can implement corresponding functions implemented by the terminal device in the foregoing method, and the network device 820 can implement corresponding functions implemented by the network device in the foregoing method. For brevity, details thereof are not described herein again.

It should be understood that, the processor of the embodiments of the present disclosure may be an integrated circuit chip, and have a signal processing capability, and the steps of the foregoing method embodiment may be implemented by using a hardware integrated logic circuit in the processor and/or implemented by using an instruction in a software form. The foregoing processor may be a general purpose processor, a digital signal processor (DSP), an application specific integrated circuit (ASIC), a field programmable gate array (FPGA) or another programmable logic device, a discrete gate or transistor logic device, or a discrete hardware component. The respective methods, steps or logic blocks disclosed in the embodiments of the present disclosure may be achieved or executed. The general purpose processor may be a microprocessor, or may be any conventional processor, or the like. Steps of the methods disclosed with reference to the embodiments of the present disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method in combination with hardware of the processor.

It should be understood that, the memory in the embodiments of the present disclosure may be a volatile memory or a non-volatile memory, or may include both the volatile memory and non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synclink dynamic random access memory (SLDRAM), and a direct rambus random access memory (DR RAM). It should be noted that, the memory of the system and the method described herein is intended to include but is not limited to these memories and any other suitable type of memory.

It should be understood that, the above memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in the embodiments of the present disclosure is intended to include but is not limited to these memories and any other suitable type of memory.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details thereof are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details thereof are not described herein again.

An embodiment of the present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details thereof are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details thereof are not described herein again.

An embodiment of the present disclosure further provides a computer program.

Optionally, the computer program may be applied to the network device in the embodiments of the present disclosure, and when running on a computer, the computer program instruction enables the computer to execute a corresponding procedure implemented by the network device in the methods of the embodiments of the present disclosure. For brevity, details thereof are not described herein again.

Optionally, the computer program may be applied to the mobile terminal/terminal device in the embodiments of the present disclosure, and when running on a computer, the computer program instruction enables the computer to execute a corresponding procedure implemented by the mobile terminal/terminal device in the methods of the embodiments of the present disclosure. For brevity, details thereof are not described herein again.

A person of ordinary skill in the art may be aware that, units and algorithm steps described in combination with examples of the embodiments disclosed herein may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, which should not be considered that the implementation goes beyond the scope of the present disclosure.

A person skilled in the art may clearly understand that, for simple and clear description, specific working processes of the foregoing described system, apparatus, and unit may refer to corresponding process in the foregoing method embodiments, and details thereof are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for transmitting feedback information, comprising:
   receiving, by a terminal device, trigger signaling, wherein the trigger signaling is used for triggering the terminal device to send feedback information; and
   determining, by the terminal device, to send a first feedback information codebook or a second feedback information codebook according to the trigger signaling,
   wherein the first feedback information codebook comprises feedback information corresponding to at least one downlink channel indicated by the trigger signaling, and
   the second feedback information codebook is a full codebook,
   wherein the trigger signaling is used for indicating at least one downlink channel group, the first feedback information codebook is determined by the terminal device according to the trigger signaling, and the at least one downlink channel group comprises the at least one downlink channel,
   wherein the trigger signaling comprises a first information field, and
   determining, by the terminal device, to send the first feedback information codebook or the second feedback information codebook according to the trigger signaling comprises:
   determining, by the terminal device, to send the first feedback information codebook if the first information field is a first preset value; or
   determining, by the terminal device, to send the second feedback information codebook if the first information field is a second preset value.

2. The method according to claim 1, wherein the second feedback information codebook is determined by the terminal device according to a maximum number of HARQ processes configured by a network device, and the second feedback information codebook comprises feedback information corresponding to all HARQ processes configured by the network device.

3. The method according to claim 2, wherein if a time interval between an end time of a first HARQ process received by the terminal device and a start time of sending the second feedback information codebook is less than or equal to a second preset time, feedback information corresponding to the first HARQ process is NACK information or occupancy information.

4. The method according to claim 2, wherein if a second HARQ process is not received by the terminal device, feedback information corresponding to the second HARQ process is NACK information or occupancy information.

5. The method according to claim 1, wherein the trigger signaling comprises a second information field, and
   if the first information field is the first preset value, the second information field is used for indicating information for the at least one downlink channel group.

6. The method according to claim 1, wherein feedback information bits in the second feedback information codebook are ordered according to HARQ process indexes.

7. A method for transmitting feedback information, comprising:
   sending, by a network device, trigger signaling, wherein the trigger signaling is used for triggering a terminal device to send a first feedback information codebook or a second feedback information codebook,
   wherein the first feedback information codebook comprises feedback information of at least one downlink channel indicated by the trigger signaling, and
   the second feedback information codebook is a full codebook,
   wherein the trigger signaling is used for indicating at least one downlink channel group, the first feedback information codebook is sent, and the at least one downlink channel group comprises the at least one downlink channel,
   wherein the trigger signaling comprises a first information field,
   if the first information field is a first preset value, the first information field is used for indicating the terminal device to send the first feedback information codebook, or
   if the first information field is a second preset value, the first information field is used for indicating the terminal device to send the second feedback information codebook.

8. The method according to claim 7, wherein the second feedback information codebook is determined by the terminal device according to a maximum number of HARQ processes configured by the network device, and the second feedback information codebook comprises feedback information corresponding to all HARQ processes configured by the network device.

9. A terminal device, comprising:
a memory, having a computer program stored thereon; and
a processor, configured to call and run the computer program stored on the memory to execute a method for transmitting feedback information,
wherein the method for transmitting feedback information comprises:
- receiving, by the terminal device, trigger signaling, wherein the trigger signaling is used for triggering the terminal device to send feedback information; and
- determining, by the terminal device, to send a first feedback information codebook or a second feedback information codebook according to the trigger signaling,
- wherein the first feedback information codebook comprises feedback information corresponding to at least one downlink channel indicated by the trigger signaling, and
- the second feedback information codebook is a full codebook,
- wherein the trigger signaling is used for indicating at least one downlink channel group, the first feedback information codebook is determined by the terminal device according to the trigger signaling, and the at least one downlink channel group comprises the at least one downlink channel,
- wherein the trigger signaling comprises a first information field, and
- determining, by the terminal device, to send the first feedback information codebook or the second feedback information codebook according to the trigger signaling comprises:
  - determining, by the terminal device, to send the first feedback information codebook if the first information field is a first preset value; or
  - determining, by the terminal device, to send the second feedback information codebook if the first information field is a second preset value.

10. The terminal device according to claim 9, wherein the second feedback information codebook is determined by the terminal device according to a maximum number of HARQ processes configured by a network device, and the second feedback information codebook comprises feedback information corresponding to all HARQ processes configured by the network device.

11. The terminal device according to claim 10, wherein if a time interval between an end time of a first HARQ process received by the terminal device and a start time of sending the second feedback information codebook is less than or equal to a second preset time, feedback information corresponding to the first HARQ process is NACK information or occupancy information.

12. The terminal device according to claim 10, wherein if a second HARQ process is not received by the terminal device, feedback information corresponding to the second HARQ process is NACK information or occupancy information.

13. The terminal device according to claim 9, wherein the trigger signaling comprises a second information field, and
if the first information field is the first preset value, the second information field is used for indicating information for the at least one downlink channel group.

14. The terminal device according to claim 9, wherein feedback information bits in the second feedback information codebook are ordered according to HARQ process indexes.

* * * * *